March 25, 1941.	E. C. S. CLENCH	2,236,467
LIQUID PRESSURE REMOTE CONTROL SYSTEM
Filed March 11, 1939	3 Sheets-Sheet 1

Inventor
E. C. S. Clench
By Stevens and Davis
Attys.

March 25, 1941. E. C. S. CLENCH 2,236,467
LIQUID PRESSURE REMOTE CONTROL SYSTEM
Filed March 11, 1939 3 Sheets-Sheet 2
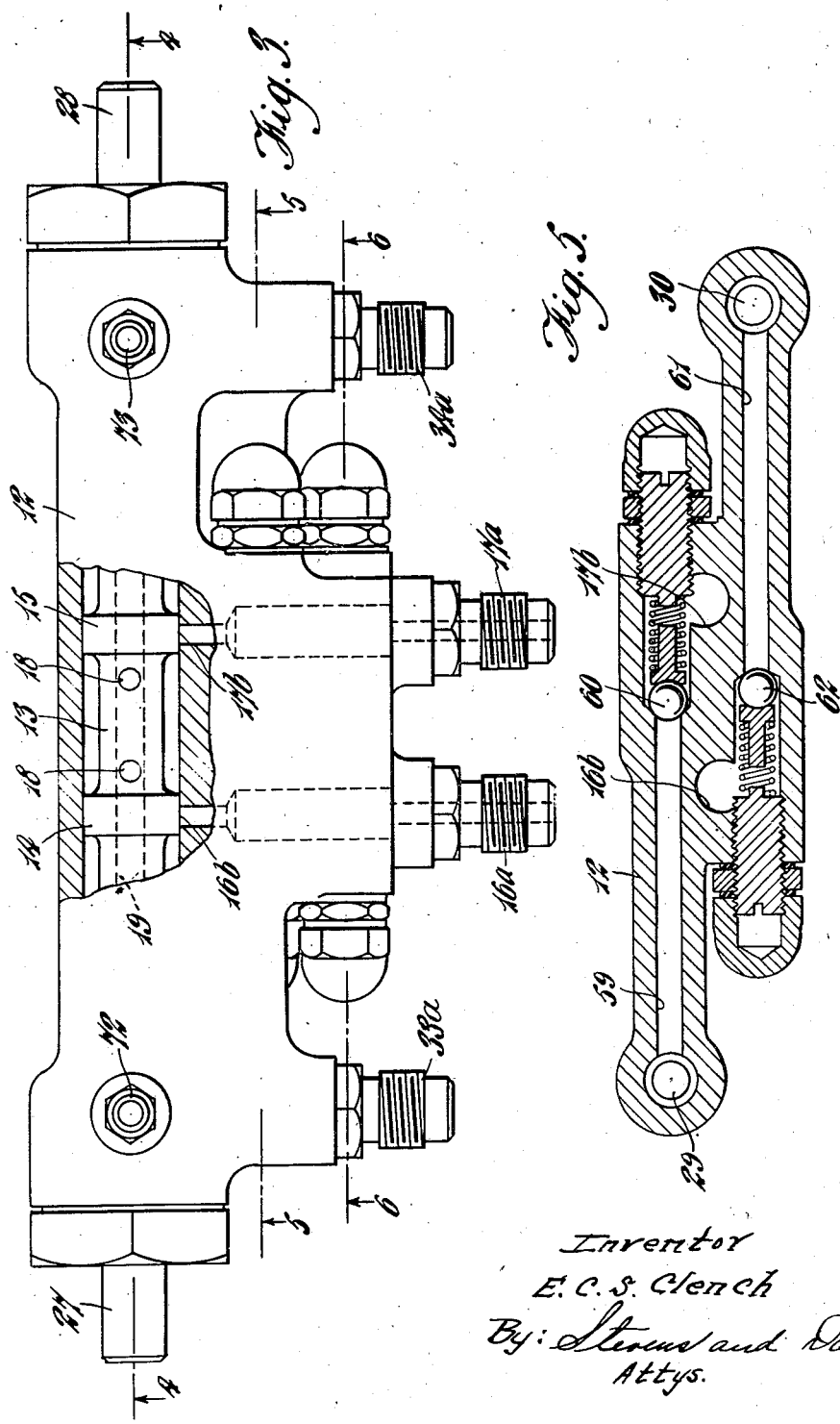
Inventor
E. C. S. Clench
By: Stevens and Davis
Attys.

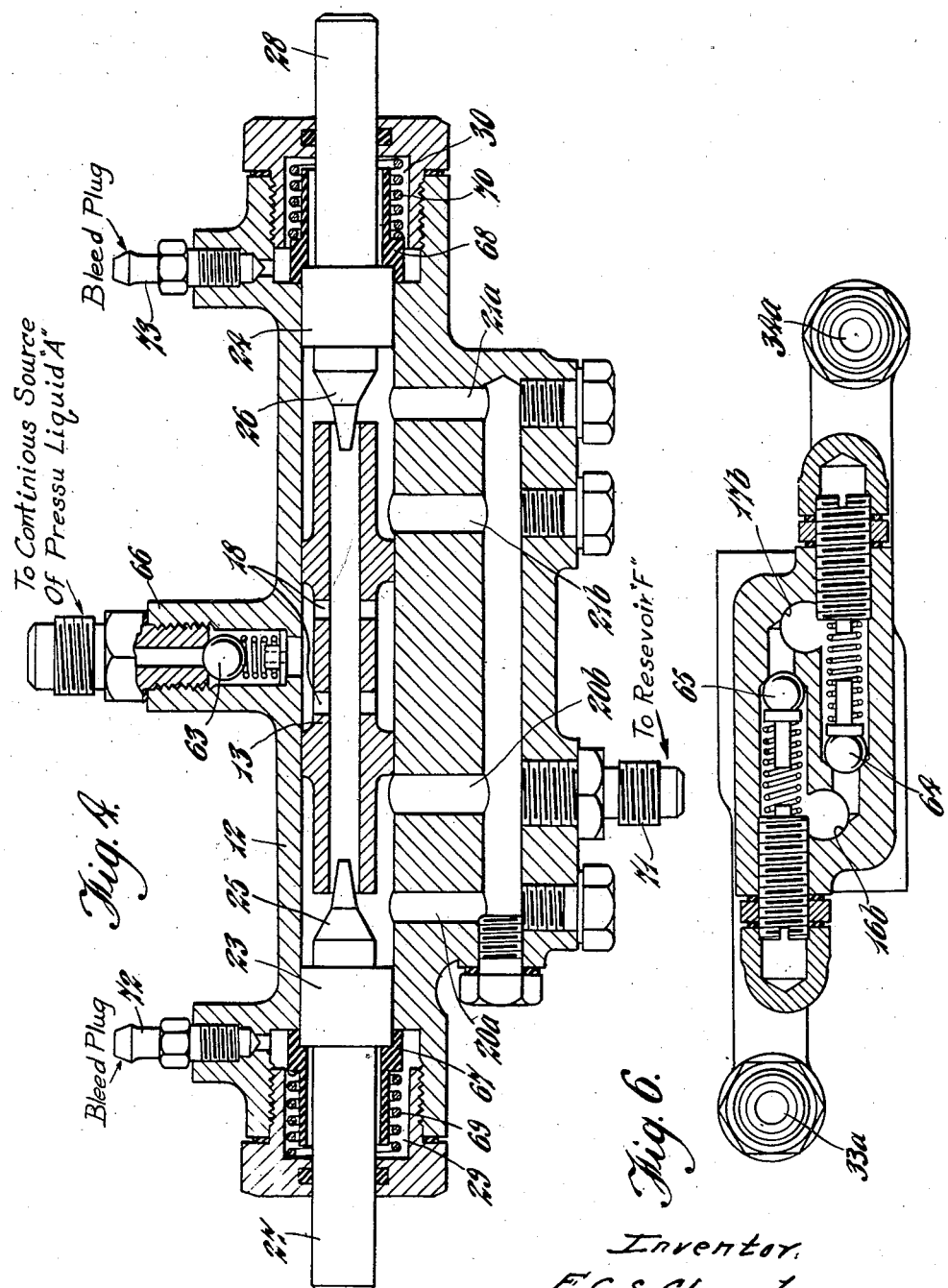

Patented Mar. 25, 1941

2,236,467

UNITED STATES PATENT OFFICE 2,236,467

LIQUID PRESSURE REMOTE CONTROL SYSTEM

Edward Claude Shakespeare Clench, London, England, assignor to Automotive Products Company Limited, London, England Application March 11, 1939, Serial No. 261,335
In Great Britain March 12, 1938

2 Claims. (Cl. 60—52)

This invention relates to liquid pressure remote control systems.

It is the object of the present invention to provide an improved form and construction of liquid pressure remote control system of the kind in which a manually actuated transmitter pump is normally adapted to operate a valve device controlling the flow of pressure liquid from a source to a hydraulic motor, which latter operates the rudder of a ship or any oher remotely disposed member which is to be moved. In particular, the invention sets out to provide an arrangement by which the working of the manually operated transmitter pump is rendered relatively light, but said pump is nevertheless sensitive to the liquid pressure required for the actuation of the hydraulic motor. Further, the improved system is automatic in so far as the control valve device is adapted to operate in the manner of a hunting vave, the movement of the hydraulic motor during each change of setting being proportional to the extent to which the transmitter pump is operated.

In order to render the manually operated transmitter pump sensitive to the load encountered by the hydraulic motor, an arrangement is provided such that the pressure of the liquid passing to the hydraulic motor tends to build up pressure in the pipe lines of the manually operated transmitter pump, thereby causing the load upon the latter to vary in accordance with the pressure of the liquid fed to the hydraulic motor from the source.

It is a further object of the present invention to provide means for counteracting the pressure rise produced in the system by the actuation of the transmitter pump to thereby return the control valve to its "off position" after the predetermined actuation of the hydraulic motor has been completed.

It is a feature of the present invention that the control valve is provided with a working space connected with both the transmitter pump and the hydraulic motor.

Other objects and advantages of the invention will be apparent from a consideration of the following detailed description of a preferred embodiment thereof when taken in conjunction with the accompanying drawings wherein:

Figure 3 is a plan view of one construction of a control valve device shown partly in section;

Figure 4 is a sectional elevation taken on the line 4—4 of Figure 3; and

Figures 5 and 6 are fragmentary sectional elevations taken on the lines 5—5 and 6—6 respectively of Figure 3.

Figure 1:
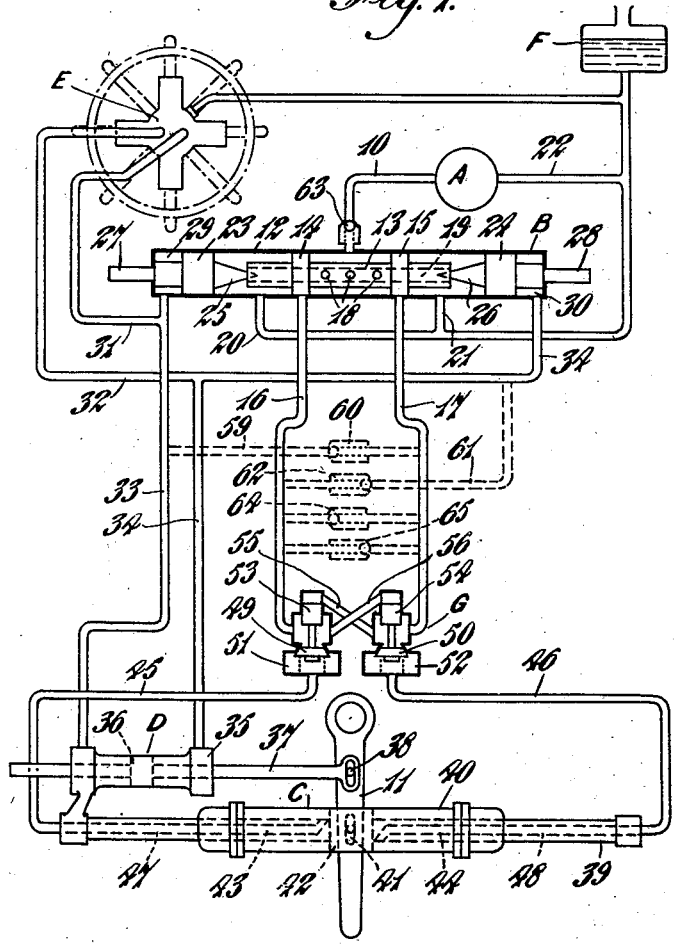
Figure 1 is a diagram showing the components and connections of the system.
Figure 2:
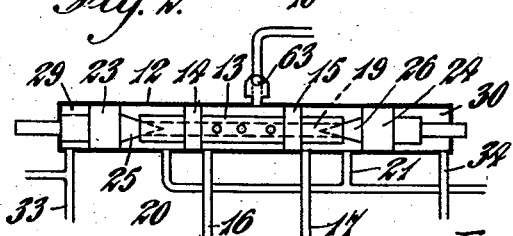
Figure 2 is a fragmentary view of the control valve device with the parts in their operative positions.

The system shown in Figures 1 and 2 comprises briefly a motor driven pump or other convenient continuous source of pressure liquid indicated at A adapted to feed said liquid through a pipe connection 10 and a control valve device B to a hydraulic motor unit C adapted to operate the tiller 11 of a ship. Associated with the hydraulic motor C is an auxiliary piston and cylinder unit D which is connected with a manually operated reversible flow transmitter pump E adapted to control the whole system by taking charge of the valve device B. A reservoir F containing spare liquid serves for replenishing both of the pumps A and E.

The control valve device B comprises a cylindrical housing 12 containing at its middle part a piston valve member 13 which is formed with a pair of collars 14 and 15 adapted to control the passage of liquid from the pipe 10 to pipes 16 and 17 leading to the hydraulic motor unit C. When the member 13 is in its central position both of the pipes 16 and 17 are closed but the delivery from the pump A is able to pass through holes 18 in the valve member 13 and thence flow through a passage 19 bored axially through said valve member, the liquid thus reaching pipes 20 and 21 leading to the inlet pipe 22 of the pump A and also to the reservoir F. In this way a free circulation of liquid is obtained when the system is inoperative. A pair of partition pistons 23 and 24 is provided within the housing 12 one at each end thereof, said pistons having conical or frusto-conical portions 25 and 26 respectively which are adapted to engage within the corresponding ends of the bore 19 so as to block the latter completely when the control valve device B is operative. In the position shown in Figure 1 however the pistons 23 and 24 are retracted and permit liquid to escape from both ends of the bore 19. Stems 27 and 28 formed upon the pistons 23 and 24 are slidably mounted in the end walls of the housing 12, and thus produce two substantially annular working spaces 29 and 30 which are connected by pipes 33 and 34 with the two ends of the auxiliary cylinder and piston unit D. Pipes 31 and 32, which are coupled to the pipes 33 and 34, connect the spaces 29 and 30 with the transmitter pump E. The auxiliary cylinder and piston unit D comprises a cylinder 35 which is held stationary and is fitted with a slidable piston 36 carried by a piston rod 37, the latter being connected with the tiller 11 conveniently by a pin and slot connection 38. As the tiller 11 moves angularly, therefore, the piston 36 slides along the cylinder 35, thus drawing in liquid through one of the pipes 33 and 34 and rejecting liquid through the other pipe according to the direction in which the tiller 11 is moving.

The hydraulic motor unit C has a fixed piston rod 39 and a cylinder 40 which is slidable upon said rod, said cylinder being connected with the tiller 11 to operate the latter through the medium of a pin and slot connection 41. A piston 42 which is fixed upon the piston rod 39 divides the interior of the cylinder 40 into two working spaces indicated at 43 and 44, these being arranged to communicate with pipe lines 45 and 46 through passages 47 and 48 extending through the piston rod 39 from each end thereof as shown. Thus pressure liquid fed through the pipe 45 moves the cylinder 40 to the left, and the admission of pressure liquid through the pipe line 46 similarly causes the cylinder 40 to move towards the right.

An interlocking valve device of the known form is conveniently incorporated and is indicated at G in Figure 1, said device being arranged to prevent movement of the tiller 11 except by the influence of pressure liquid fed through the pipe lines 45 and 46. A pair of mushroom valves 49 and 50 are slidably mounted in housings 51 and 52 so as normally to isolate the pipe lines 45 and 46 from the pipes 16 and 17 respectively. The valves 49 and 50 are provided with pistons 53 and 54 which slide within the housings 51 and 52 and are subject to the pressure in the pipes 17 and 16 respectively owing to the provision of interconnecting passages 55 and 56. When the system is inoperative the cylinder 40 cannot move in either direction as the valves 49 and 50 prevent liquid from being expelled, but should pressure liquid be fed through the pipe 16 for example, it not only passes the mushroom valve 49 but also exerts a downward force upon the piston 54 which opens the other mushroom valve 50 and enables the working liquid to be returned by the hydraulic motor C.

Assuming that the pump A is being driven the method of operation is as follows: To move the tiller 11 to the left the transmitter pump E is rotated so as to cause liquid to flow through the pipe 32 and into the annular working space 30, thus forcing the partition piston 24 to the left. The frusto-conical portion 26 thereof blocks the right hand end of the bore 19 and forces the control valve member 13 also to the left until its left hand end also becomes blocked by the frusto-conical portion 25 of the partition piston 23. This prevents the liquid fed through the pipe 10 from passing into the pipes 20 and 21 but the displacement of the valve member 13 has uncovered the end of the pipe 16 as shown in Figure 2, thus enabling the pressure liquid from the pump A to pass into the pipe 16 and thence through the pipe line 45 to the working space 43 of the hydraulic motor C. The cylinder 40 together with the tiller 11 are thus moved to the left and simultaneously cause the piston 36 also to be moved to the left, thus drawing in liquid from the pipe 34. Assuming that the transmitter pump E has only been operated to a predetermined extent, it will be apparent that the piston 36 will withdraw liquid from the working space 30, thus causing the partition piston 24 to free itself from the end of the valve member 13 and consequently restoring the connection between the pipe 10 and the pipes 20, 21. In this way the pump A is again able to circulate liquid freely until such time as the transmitter pump E is next operated.

It will be seen that, when the transmitter pump E is operated to move the valve member 13 away from its centralized position, the pressure produced by the pump A acts in some measure to oppose further movement of said transmitter pump, and as a consequence the "feel" of the transmitter pump gives the operator some idea of the resistance which is being offered to the movement of the tiller 11. This is primarily because the pressure liquid from the pump A passes through the holes 18 in the valve member 13 and acts upon the extremity of the frusto-conical portion of the partition piston which is moved by the transmitter pump, say the portion 26 in Figure 2, so that the operator has to maintain sufficient pressure in the space 30 in order to hold the piston 24 against the end of the valve member 13. The liquid pressure necessary to hold the piston 24 in this position however need not be very great, as that part of the area of the piston 24 upon which the pressure in the space 30 acts can readily be made many times greater than the cross-sectional area of the bore 19. If the ratio of these areas is say five to one it will be apparent that the operator will have to rotate the transmitter pump E sufficient to produce approximately one fifth of the pressure that he desires to be present in the pipe line 45 or 46 actuating the hydraulic motor unit C.

The system is also arranged so that in the event of the pump A being inoperative the hydraulic motor C can still be worked by the transmitter pump E, although at a very much slower rate than usual. For this purpose a pipe indicated in broken lines at 59 and having a lightly loaded non-return valve 60 joins the pipe 33 with the pipe 17, while a similar pipe 61 having a non-return valve 62 forms a connection between the pipe 34 and the pipe 16. Thus, when the transmitter pump E is rotated to deliver liquid through the pipe 32 said liquid passes as before into the space 30 at the end of the control valve device B, and urges the piston 24, the valve 13 and the piston 23 all towards the left so that they occupy the positions shown in Figure 2. The liquid also passes the non-return valve 62, and as it cannot flow to the pump A owing to the provision of a non-return valve 63 in the pipe connection 10 said liquid is forced to flow into the pipe line 45, thus actuating the hydraulic motor C. Liquid rejected from the working space 44 can, of course, pass through the pipe line 46 and back to the reservoir F by way of the pipes 17 and 21. By rotating the transmitter pump E in the opposite direction the parts 23, 13 and 24 of the control valve are moved to the right, and as a consequence the pressure liquid passes the non-return valve 60 to actuate the hydraulic motor C in the opposite direction. In order to prevent an excessive pressure being built up when the hydraulic motor is being actuated, relief valves 64 and 65 are connected across the pipes 16 and 17 as indicated diagrammatically in Figure 1, the springs of said valves being relatively strong so as to prevent the valves from opening under the effect of the normal working pressure.

Figures 3 to 6 show a constructional form of control valve working in the manner hereinbefore described, and similar reference numerals are used to indicate the various parts. The housing 12 is bored longitudinally for the reception of the valve member 13 and is formed at its upper part with a boss 66 accommodating the non-return valve 63. The two ends of the valve member 13 are adapted to be closed as before by frusto-conical projections 25 and 26 upon partition pistons 23 and 24, the stem portions 27 and 28 of the latter being arranged to slide within sleeves indicated at 67 and 68 respectively. These sleeves are acted upon by coiled compression springs 69 and 70 which serve as buffers, and which enable a resilient axial pressure to be exerted upon the valve member 13 when it is disposed in its operative position. A connection 71 is intended to be joined to the reservoir and communicates inside the housing 12 with four passages 20a, 20b, 21a and 21b serving the same purpose as the passages 20 and 21 in Figure 1. A pair of pipe connections 16a and 17a are used for connection to the pipe lines 16 and 17 respectively, and terminate within the housing in ports 16b and 17b adapted to be closed simultaneously by the collars 14 and 15 when the valve member 13 is in its central position. Similarly unions 33a and 34a communicate with the working spaces 29 and 30 respectively and are used for connecting to the transmitter pump E and the auxiliary piston and cylinder unit D. A pair of bleed plugs 72 and 73 enable air to be readily withdrawn from the spaces 29 and 30 when the installation is being filled with liquid. The arrangement of the valves 60, 62, 64 and 65 is shown in Figures 5 and 6.

The improved system is light to operate in view of the fact that the main part of the work in actuating the hydraulic motor is effected by the power driven pump or equivalent source of liquid pressure, but the transmitter unit by which the operator controls the action is nevertheless subject in a small degree to fluctuations of pressure in the main pipe lines, so that in addition the transmitter pump gives an impression of lievliness which assists in the precise manipulation of the system. The invention may obviously be applied to systems other than those used for the steering mechanism of ships and the construction of the parts may be varied to suit requirements.

I claim:

1. In a liquid pressure remote control system having a motor unit fed with liquid under pressure by a continuously driven main pump, the provision of controlling means comprising a reversible flow manually operable transmitter pump, a double acting piston and cylinder structure connected to opposite sides of said transmitter pump by means of a pair of pipe lines and having either the piston or the cylinder operated mechanically by movement of the motor unit to provide a follow-up action, and a control valve having a cylindrical housing, a piston valve member slidable therein and formed with a pair of spaced flanges controlling ports in the housing leading to the motor unit, an axial passageway extending from end to end of the piston valve member and communicating permanently with the space between the flanges, a connection from the main pump also to said space between the flanges, said axial passageway providing normally a free bypass back to the pump, a pair of partition pistons slidable in the housing and providing at the ends thereof a pair of working spaces connected respectively with opposite sides of the transmitter pump, and a tapering projection formed on each partition piston and arranged to close the corresponding end of the axial passageway in the piston valve member, so that operation of said transmitter pump causes one of the partition pistons to move the piston valve member to a position in which both ends of the axial passageway are closed by the tapering projections, thereby diverting the continuous supply of pressure liquid to the motor unit, but causing the pressure of said liquid to act upon a part of the area of said partition piston, thus counteracting in part the force applied to said partition piston by liquid from the transmitter pump.

2. In a liquid pressure remote control system having a motor unit fed with liquid under pressure by a continuously driven main pump, the provision for controlling means comprising a reversible flow manually operable transmitter pump, a double acting piston and cylinder structure connected to opposite sides of said transmitter pump by means of a pair of pipe lines and having either the piston or the cylinder operated mechanically by movement of the motor unit to provide a follow-up action, and a control valve having a cylindrical housing with ports therein, a piston valve member slidable in said housing to control flow through said ports, said piston valve member having an axial passageway therethrough by which the continuous supply of pressure liquid is normally free to return to the pump, an independent slidable partition piston mounted within said housing at each end of said piston valve member, means operatively connecting one of said pistons with each side of said transmitter pump said pistons being movable by operation of said transmitter pump to shift the position of said piston valve member and at the same time to close the axial passageway therethrough, whereby the operation of said transmitter pump causes adjustment of said piston valve member thereby diverting the continuous supply of pressure liquid to the motor unit and causing the pressure of said liquid to act upon a partition piston thus counteracting in part the force applied to said partition piston by liquid from the transmitter pump.

EDWARD CLAUDE SHAKESPEARE CLENCH.